Patented Dec. 26, 1933

1,941,415

UNITED STATES PATENT OFFICE

1,941,415

METHOD OF TREATING MILK AND MILK PRODUCTS TO RECOVER THE CONTAINED MILKFAT IN SUBSTANTIALLY PURE AND NEUTRAL CONDITION

Milton E. Parker, Baltimore, Md., and Sidney Quam, Danville, Ill., assignors to Research Laboratories of National Dairy Products Corporation, Inc., Baltimore, Md., a corporation of Maryland No Drawing. Application July 30, 1932
Serial No. 627,138

20 Claims. (Cl. 99—11)

The present invention relates to improvements in processes of treating milks and milk products to recover their contained milkfat in substantially pure condition.

It is a further object of this invention to treat the recovered milkfat so as to obtain a product having increased resistance to oxidative influences and of a neutral, bland fat flavor and substantially no odor. In other words, it is an object of the invention to produce a durable milk fat having the above mentioned characteristics.

The primary object of our invention is to provide improvements whereby milkfat in a substantially pure state can be extracted by centrifugal means from milks and milk products such as whole milk, concentrated milks, buttermilk, sweet and sour milk, sweet and sour cream and butter. The present invention is operative upon milks and milk products having a substantially normal quantity of moisture, or, a mixture of milks and milk products and water wherein an appreciable dilution has been applied. By mixture we mean any combination of the above mentioned milks and milk products, i. e., whole milk and cream, whole milk, cream and butter. Furtherore, the acidity of the milks or milk products, whether of a normal amount, or, of an advanced stage of fermentation, is immaterial as the invention is operative under any condition of acidity.

This invention insofar as it relates to the recovery of a substantially pure milkfat from milks or milk products is an improvement of the process recited in the application of Milton E. Parker, filed January 24th, 1930, Serial No. 423,255, in connection with sweet or sour cream and this application is a continuation in part of said application.

As set forth in said Parker application, the cream is subjected to a preliminary dilution with water, and we have found that such a method in connection with sweet or sour milks and milk products will assist in more completely and quickly dissolving the curd, or, curd constituents, and enable the recovery of milkfat in the separated product in very high concentration.

We preferably treat the end products extracted from sweet or sour cream in accordance with the Parker process, and we may also treat the end product extracted from sweet or sour milks and milk products in accordance with conventional processes.

By treating the end products so recovered, the present invention is operative to extract substantially pure milkfat.

In referring to the dilution step in both the Parker process, and as a novel step in conventional methods, it will be understood that we propose to dilute the milks or milk products with sufficient water to accomplish the purpose of materially aiding in dissolving the curds and curd constituents, and, while we recommend the use of an equal volume of water, this amount will naturally vary with the condition of the particular milks, or milk products, under treatment. We have successfully operated using water in substantially 25% by volume. By this dilution step, moreover, the final product has a much higher percentage of milkfat than was heretofore obtainable.

While we may employ the end product of the Parker process or the end product of any of the coventional processes as above mentioned, we prefer to proceed by a further novel method, wherein sweet or sour milks, or other milk products as above mentioned, having a substantially normal amount of moisture or diluted to have an appreciable moisture content, will first be preferably preheated to a temperature of 170° F.–185° F., care being taken not to reach a lower temperature than 160° F. The temperature range hereinabove given will be equally applicable in connection with the other processes referred to, and the same care must be taken not to reach a lower temperature than 160° F., in order to eliminate volatile products which may be toxic, or otherwise inhibitory, to maximum hydrolytic action upon the curds and curd constituents to be digested, especially when enzymic action is resorted to. That is to say, in the Parker process for example, this preliminary heating is accomplished at any point prior to the introduction of the enzyme, and the same is true with respect to other preliminary or conventional treatments. This preliminary heating treatment applied to the milks and milk products, either of substantially normal moisture content, or, of an appreciable dilution with water, also, has the effect of facilitating the gravity separation of the fat and serum phases of the milks, or milk products, to be treated.

The heated mass is then cooled preferably to 115° F.–135° F. and is then subjected to a pH adjustment, preferably with caustic soda (sodium hydroxide), although other materials such as the oxides, hydroxides and carbonates of calcium, and magnesium, the secondary and tertiary phosphates of sodium and the carbonates and bicarbonates of sodium, either separately or together, may be employed. The pH adjustment is to substantially pH 7.0–pH 8.5.

The purpose of this pH adjustment is to obtain a favorable hydrogen ion concentration for the digestive action of the proteins in the serum phase by trypsin, or other animal and vegetable ferments.

In using trypsin or any enzyme, it is necessary to avoid any appreciable digestion of the fat phase, and if a pure trypsin is not available we employ vegetable enzymes such as papain, or a mixture of vegetable and animal ferments. In order to be satisfactory the ferments should digest at least 50 to 75 parts of casein or protein for every one part of ferment added under the conditions of assay as applied by the Fuld-Gross test, and should not appreciably digest the fat phase, i. e., should not increase the acid number of the fat by more than 0.2–0.5.

To the adjusted mass as above specified is added trypsin or papain in concentrations of not less than 1 part of enzyme per 75 parts of casein and albumin contained in the original milk, or milk product under treatment. We have used successfully smaller amounts of the enzyme dependent upon its purity, i. e., 1 to 360. We have found that for all practical purposes, such concentrations of trypsin or papain can be readily computed by multiplying the weight of the milk, or milk product, by the factor 0.03 and dividing the product thereof by the factor 75 to give the weight of trypsin required. The trypsin or papain is preferably added by first making a paste with the adjusted milk, or milk product, and gradually diluting until it can be added in a concentrated liquid form to the mass of material to be digested. Adding the trypsin or papain directly will also give satisfactory results except that it will require more time for it to be uniformly distributed throughout the mass of material to be digested.

The mixture of the adjusted milk, or milk product, and the added enzyme, is then agitated vigorously at a temperature preferably of 115° F.–135° F., and is maintained at this temperature during such agitation for a period of approximately 45 minutes to one hour.

We have found that vigorous agitation together with the temperature range specified and the optimum hydrogen ion concentration for digestion, provide conditions for the ready and satisfactory digestion of the proteins in the serum phase within the time period specified. Digestion will proceed when these optimum conditions do not prevail but it will be at a slower rate. Slight deviations may be found desirable with varying conditions of the milk, or milk product, under treatment but the conditions of hydrogen ion concentration, temperature range, agitation and period of digestion as herein set forth will give the most satisfactory results.

It has been found that the digestion can be materially hastened by diluting the milk, or milk product, under treatment with water. For purposes of illustration, it may be stated that an equal volume of water will be employed for the dilution purpose. However, we have used as low as 25% dilution with excellent results. Under such condition of dilution, the digestion period normally will be less than that specified above.

While dilution with water materially hastens the digestion, it also has the added effect of increasing the fat losses of the subsequent centrifugal separation. However, dilution with an equal volume of water for this hastening of digestion will normally result in a fat loss not exceeding 0.75% by weight of the original milk, or milk product, under treatment. This value is one determined by the Gottlieb method of fat determination. When dilution is not resorted to, or does not exceed 25%, and the milk, or milk product, under treatment contains only a substantially normal amount of moisture or added moisture to the amount of 25%, the fat loss as measured by the Gottlieb method of fat determination will normally not exceed 0.4–0.6% by weight of the original milk, or milk product, under treatment. The former fat loss is about of the same order of magnitude as that involved in conventional methods of treating cream for recovery of its contained milkfat whereas the latter is comparatively and considerably lesser.

It should be stated at this point that not only those milks and milk products mentioned above can be treated in accordance with the process described above, but reconstituted milk or cream prepared from concentrated milks, dried milks, butter and other similar products may be treated with equally good results. For example, we reconstitute the concentrated and dried milks with a suitable amount of water, and in the case of butter, we use skimmilk, buttermilk or water, or a combination of these, i. e., all three or buttermilk and water or skimmilk and water. Such reconstituted products as stated are operative with this invention.

Upon completion of the digestion step described above, either with a milk or milk product, or the reconstituted products having a substantially normal moisture content, or, with an appreciable dilution of water as described, without further adjustment, the mixture is then heated preferably to 210° F., although satisfactory results have been obtained with temperatures as low as 165° F. The higher temperature is preferred inasmuch as it destroys all enzymic action and thus eliminates the possibility of contaminating the separated milkfat with traces of lipolytic enzymes introduced by the added enzyme, or contained in the original milk or milk product, or both.

It should be understood that in the preferred process, we will use an enzyme, such as trypsin or papain, and the mixture after the enzymic digestion described above, is heated to destroy such enzyme. An enzyme such as pepsin may also be used but it will require a different hydrogen ion concentration adjustment for optimum digestive action, namely pH 2.0–pH 2.5, and a longer digestion period. The mixture then is passed to a suitable separator, preferably of the centrifugal type, while maintained at a temperature of preferably 210° F., and not appreciably below 165° F. At such temperature the milk fat is liquid.

In this separation step, the tailings comprising solids, digested proteins, and water are discharged and substantially pure milkfat is recovered. It should be stated at this point that the tailings because of the digested proteins contained therein provide a valuable source of animal and poultry feed either as discharged from the separator or in a concentrated or dried form. The tailings can also be added to normal or churn buttermilk for mixing and subsequent concentration or drying in the manufacture of feedstuffs without detriment to its food value and quality. The tailings of an enzymic digestion of this sort are superior to those obtained from other processes wherein the milk products under treatment are rendered alkaline and thus spoiled as a desirable feedstuff.

It is found that the milkfat obtained by the process outlined above for sweet or sour milks, and milk products, will have a content of substantially 99–99½% milkfat, with no appreciable amounts of curd or nitrogenous material, the remainder being water or moisture.

The end product of the process recited in the application of Milton E. Parker, filed January 24th, 1930, Serial No. 423,255, in connection with sweet or sour cream, or the end products of other digestion processes, will be treated in accordance with an additional step to be described hereinafter to recover substantially pure milkfat.

A further method which we prefer to use is as follows:

We add to the diluted, unadjusted milk or milk product, a suitable concentration of an enzyme such as papain, namely 0.0015%. The pH range of sweet milk or milk product which normally is pH 6.0–6.8 will provide the optimum acidity conditions while the temperature will be 125° F. or within the range of 105°–135° F. The digestion will proceed for a period of thirty minutes to one hour. The mixture will then be adjusted with a suitable alkali, as herein mentioned, to pH 7.5, or within the range of pH 7.0–8.5 when a suitable concentration of an animal or vegetable trypsin, preferably the latter, will be added, namely 0.0015%. The digestion will then proceed with this enzyme for a period of thirty minutes to one hour when the mixture will be heated as described herein, for separation. Of course, dilution and precaution of originally preheating the milk or milk product will be observed, as above set forth.

Normally, the single tryptic digestion of a sour milk or milk product is adequate although this double digestion method can also be applied with the following exception to the procedure outlined for sweet milk. Sour cream normally has a pH varying from pH 3.5 to 5.0. Such cream should be adjusted with a suitable acid, as described herein, to pH 2.5–3.0 and pepsin added in suitable concentration, namely 0.003% and digested in the usual manner at a temperature of 135° F. or 125° F.–145° F. followed by adjustment of the mixture to pH 7.5 for the tryptic digestion.

The concentrations of the enzymes mentioned above are based on the weight of the cream under treatment and not the diluted milk product.

It is found that the milkfat obtained by the enzymic processes herein outlined from a sweet or sour milk or milk products will have a content of substantially 99%–99½% fat, with no appreciable amounts of curd or nitrogenous material; the remainder being water or moisture.

The separated product from any of the enzymic digestion processes for example, the end product of the Parker process is transferred to a suitable container and mixed witht approximately four (4) volumes of water. This amount may be varied in accordance with the condition of the product, and the purpose of the invention.

Then pH adjustment is accomplished by the addition of a suitable acid, such as one of those above mentioned. The adjustment is to substantially pH 5.0–pH 6.5.

The temperature of the adjusted mixture is then raised to 210° F., and it will be understood that either the water or the product, or both, may be preliminarily raised to this temperature.

Satisfactory results have been obtained at a temperature of 150° F., but the higher temperature is preferred inasmuch as it destroys all enzymic action where enzymes have been employed, or have been contained in the original milk product.

It will be understood that the addition of the acid to adjust the pH in the washing step described hereinabove is preferably accomplished by adding the acid to the aqueous mixture in the form of a solution, and the amount necessary being determined by hydrogen ion titration.

The aqueous mixture is thereafter transferred to a suitable separator, preferably a centrifuge, and the milkfat recovered.

It will be understood that by utilizing the end product of the Parker process in the manner set forth above and subjecting it to a treatment involving washing, pH adjustment, and separation, the final product will test substantially 99–99½% fat, with no appreciable amounts of curd or nitrogenous material; the remainder being water or moisture.

By utilizing the end products of the various enzymic processes which have been set forth above including those from conventional processes (excepting that process involving the preferred single enzymic digestion) and subjecting them to a treatment involving washing, pH adjustment, and separation, as described, the final product will test substantially pure milkfat.

It will further be understood that the enzymic digestion method described above i. e. the single tryptic is preferred over all other methods mentioned or outlined inasmuch as substantially pure milkfat can be obtained directly upon completion of the digestion step in this enzymic digestion method, and without resorting to the additional pH adjustment, as in the double digestion method set forth above, or to the additional steps of washing, pH adjustment and secondary separation necessary in the other processes, for example with the Parker process, the latter processes, however, producing a very satisfactory product.

However, if upon analysis of this substantially pure extracted milkfat, or any of the extracted milkfats obtained by methods other than single digestion, it is found that it has an acid number (as determined by the Official Methods of the Association of Official Agriculture Chemists) in excess of 1.0 milligram potassium hydroxide (KOH) per gram of fat, we have found it to be desirable to utilize a washing step to eliminate the excess of free fatty acids.

The extracted milkfat is subjected to a washing step wherein a sufficient amount of a suitable alkali, such as mentioned above, is added to the wash water for the purpose of reducing the acid number of the milkfat to a normal level (0.5–1.0 mgm. KOH per gram of fat). The amount of alkali necessary for such purpose is readily estimated from its acid number. Normally, two volumes of water is sufficient for the washing step although a greater or lesser amount may be used with equal success. Thereafter, the temperature of the mixture of water, alkali and milkfat will be raised preferably to 125° F.–130° F., care being taken not to exceed 135° F.

It should be stated at this point that the milkfat and the water can be preliminarily raised to the preferred temperatures and then mixed, or they can be mixed and the temperature raised to the desired degree. The alkali can be added to the mixture in the form of an aqueous solution although it is preferred to add the alkali to the water and mix thoroughly before adding the mixture to the milkfat. Care must be taken, however, not to add the alkali directly either to the milkfat or the mixture of milkfat and water.

The mixture of the milkfat, water and alkali is thereafter transferred to a suitable separator, preferably a centrifuge, and the milkfat recovered.

It will be understood therefore that by utilizing the end products of the various processes which have been set forth above and subjecting them to a treatment involving washing, reduction of excess fatty acid content to normal levels, and separation, the final product will test substantially pure milkfat with a 99%–99½% fat content, the remainder being water or moisture. Furthermore, the milkfat itself will contain a normal amount of free fatty acids and therefore, will conform to the standards of a neutral milkfat.

It will further be understood that the reduction of the acid number of the milkfat will be applied only in those instances where it is revealed upon chemical analysis that such milkfat contains an excessive fatty acid content. In other words, reduction of the fatty acid content of milkfat will be applied when the acid number of the milkfat is excessive and has an acid number appreciably greater than 1.0 mgm. KOH per gram of fat.

It will also be understood that in referring to a neutral milkfat, we mean one which contains a normal amount of free fatty acids (e. g. 0.5–1.0 mgm. KOH per gram of fat).

The milkfat manufactured in accordance with the methods outlined above is free from the deteriorating influences of microorganisms and other biological agents such as enzymes, as well as the autolytic chemical reactions of oxidation, all of which constitute the three major factors which are capable of influencing the stability of milkfat. This is particularly true if the milkfat as described is dehydrated by the simple expedient of heating to approximately 250–260° F. to eliminate the moisture. Deodorization by the conventional vacuum methods for edible oils produces a similar result.

The substantially pure and neutral milkfat recovered from milk and milk products in accordance with the methods set forth above can be used successfully in the manufacture of butter, reconstructed milk or cream, cream cheese, ice cream mix, and any other dairy product, or food product wherein milkfat is a desired ingredient. We have found that the inherent resistance of milkfat to oxidation is not only restored but enhanced by the elimination of its deteriorating influences made possible by the various steps set forth in this invention.

We have further found that such milkfat when added to other dairy products has the property of increasing the resistance to oxidative influences of the blended milkfats so produced.

The terms "enzyme" and "digestive ferment" are used synonymously in this application.

Substantially pure, durable and bland milkfat described in this application can be employed with excellent results in producing a churnable mixture for the production of butter, as described in our application filed concurrently herewith.

What we can claim is:

1. The process of obtaining substantially pure milkfat which comprises preheating milk or a milk product, cooling and adjusting the milk or milk product to a temperature and pH for enzymic digestion of the protein phase, adding an enzyme and digesting the mass, heating the digested milk or milk product to destroy the enzyme, and separating to recover the contained milkfat.

2. The process of obtaining substantially pure milkfat which comprises diluting milk or a milk product, preheating the mixture, cooling and adjusting the mixture to a temperature and pH for enzymic digestion of the protein phase, adding an enzyme and digesting the mass, heating the digested mixture to destroy the enzyme, and separating to recover the contained milkfat.

3. The process of obtaining a substantially pure milkfat which comprises preheating milk or a milk product, cooling and adjusting the milk or milk product to a temperature and pH for enzymic digestion of the protein phase, adding an enzyme selected from a class consisting of papain and trypsin and digesting the mass, heating the digested milk or milk product to destroy the trypsin, and separating to recover the contained milkfat.

4. The process of obtaining substantially pure milkfat which comprises diluting milk or a milk product, preheating the mixture, cooling and adjusting the mixture to a temperature and pH for enzymic digestion of the protein phase, adding an enzyme selected from a class consisting of papain and trypsin and digesting the mass, heating the digested mixture to destroy the trypsin, and separating to recover the contained milkfat.

5. The process of obtaining substantially pure milkfat which comprises preheating milk or a milk product, cooling and adjusting the milk or milk product to a temperature and pH for enzymic digestion of the protein phase, adding an enzyme and digesting the mass, heating the digested milk or milk product to destroy the enzyme, and separating to obtain a high milkfat product, adjusting the pH of the high milkfat product, and washing and separating to recover the contained milkfat.

6. The process of obtaining substantially pure milkfat which comprises diluting milk or a milk product, preheating the mixture, cooling and adjusting the mixture to a temperature and pH for enzymic digestion of the protein phase, adding an enzyme and digesting the mass, heating the digested mixture to destroy the enzyme, and separating to obtain a high milkfat product, adjusting the pH of the high milkfat product, and washing and separating to recover the contained milkfat.

7. The process of obtaining substantially pure milkfat which comprises preheating milk or a milk product, cooling and adjusting the milk or milk product to a temperature and pH for enzymic digestion of the protein phase by pepsin, digesting the mass with pepsin, heating the digested milk or milk product to destroy the pepsin, and separating to obtain a high milkfat product, adjusting the pH of the high milkfat product, and washing and separating to recover the contained milkfat.

8. The process of obtaining substantially pure milkfat which comprises diluting milk or a milk product, preheating the mixture, cooling and adjusting the mixture to a temperature and pH for enzymic digestion of the protein phase by pepsin, digesting the mass with pepsin, heating the digested mixture to destroy the pepsin, and separating to obtain a high milkfat product, adjusting the pH of the high milkfat product, and washing and separating to recover the contained milkfat.

9. The process of obtaining substantially pure milkfat which comprises digesting milk or a milk product with an enzyme, adjusting the digested mass and digesting with a second enzyme, heating the digested mixture to destroy the enzymes and separating to obtain a high milkfat product.

10. The process of obtaining substantially pure milkfat which comprises digesting milk or a milk product with papain, adjusting the digested mass and digesting with another enzyme, heating the digested mixture to destroy the enzymes, and separating to obtain a high milkfat product.

11. The process of obtaining substantially pure milkfat which comprises digesting milk or a milk product with papain, adjusting the digested mass and digesting with trypsin, heating the digested mixture to destroy the enzymes, and separating to obtain a high milkfat product.

12. The process of obtaining substantially pure milkfat which comprises diluting milk or a milk product, digesting the mixture with papain, adjusting the digested mass with an alkali, digesting the adjusted mixture with trypsin, and separating to recover a substantially pure milkfat.

13. The process of obtaining substantially pure milkfat which comprises preheating milk or a milk product, digesting the mass with papain, adjusting the digested mass and digesting with trypsin, and separating to obtain a high milkfat product.

14. The process of obtaining substantially pure milkfat which comprises preheating milk or a milk product, digesting the mass with papain, adjusting the digested mass and digesting with trypsin, and separating to obtain a high milkfat product, adjusting the pH of the high milkfat product, and washing and separating to recover the contained milkfat.

15. The process of obtaining substantially pure milkfat which comprises preheating milk or a milk product, cooling and adjusting the milk or milk product to a temperature and pH for enzymic digestion of the protein phase, adding an enzyme and digesting the mass, heating the digested milk or milk product to destroy the enzyme, separating to recover the contained milkfat, treating the recovered milk fat to reduce the free fatty acids content, and separating to recover a substantially neutral milk fat.

16. The process of obtaining substantially pure milkfat which comprises preheating milk or a milk product, cooling and adjusting the milk or milk product to a temperature and pH for enzymic digestion of the protein phase, adding an enzyme and digesting the mass, heating the digested milk or milk product to destroy the enzyme, separating to recover the contained milkfat, washing the recovered milkfat and reducing the free fatty acids content, and separating to recover a substantially neutral milkfat.

17. The process of obtaining substantially pure milkfat which comprises preheating milk or a milk product, cooling and adjusting the milk or milk product to a temperature and pH for enzymic digestion of the protein phase, adding an enzyme and digesting the mass, heating the digested milk or milk product to destroy the enzyme, separating to recover the contained milkfat, washing the recovered milkfat with an alkaline solution and reducing the free fatty acids content, and separating to recover a substantially neutral milkfat.

18. The process of obtaining substantially pure milkfat which comprises diluting milk or a milk product, preheating the mixture, cooling and adjusting the mixture to a temperature and pH for enzymic digestion of the protein phase, adding an enzyme and digesting the mass, heating the digested mixture to destroy the enzyme, separating to recover the contained milkfat, treating the recovered milkfat to reduce the free fatty acids content, and separating to recover a substantially neutral milkfat.

19. The process of obtaining substantially pure milkfat which comprises diluting milk or a milk product, preheating the mixture, cooling and adjusting the mixture to a temperature and pH for enzymic digestion of the protein phase, adding an enzyme and digesting the mass, heating the digested mixture to destroy the enzyme, separating to recover the contained milkfat, washing the recovered milkfat and reducing the free fatty acids content, and separating to recover a substantially neutral milkfat.

20. The process of obtaining substantially pure milkfat which comprises diluting milk or a milk product, preheating the mixture, cooling and adjusting the mixture to a temperature and pH for enzymic digestion of the protein phase, adding an enzyme and digesting the mass, heating the digested mixture to destroy the enzyme, separating to recover the contained milkfat, washing the recovered milkfat with an alkaline solution and reducing the free fatty acids content, and separating to recover a substantially neutral milkfat.

MILTON E. PARKER.
SIDNEY QUAM.